March 1, 1938. L. F. R. FELL 2,109,526
BUILT-UP CRANKSHAFT
Filed Feb. 15, 1937
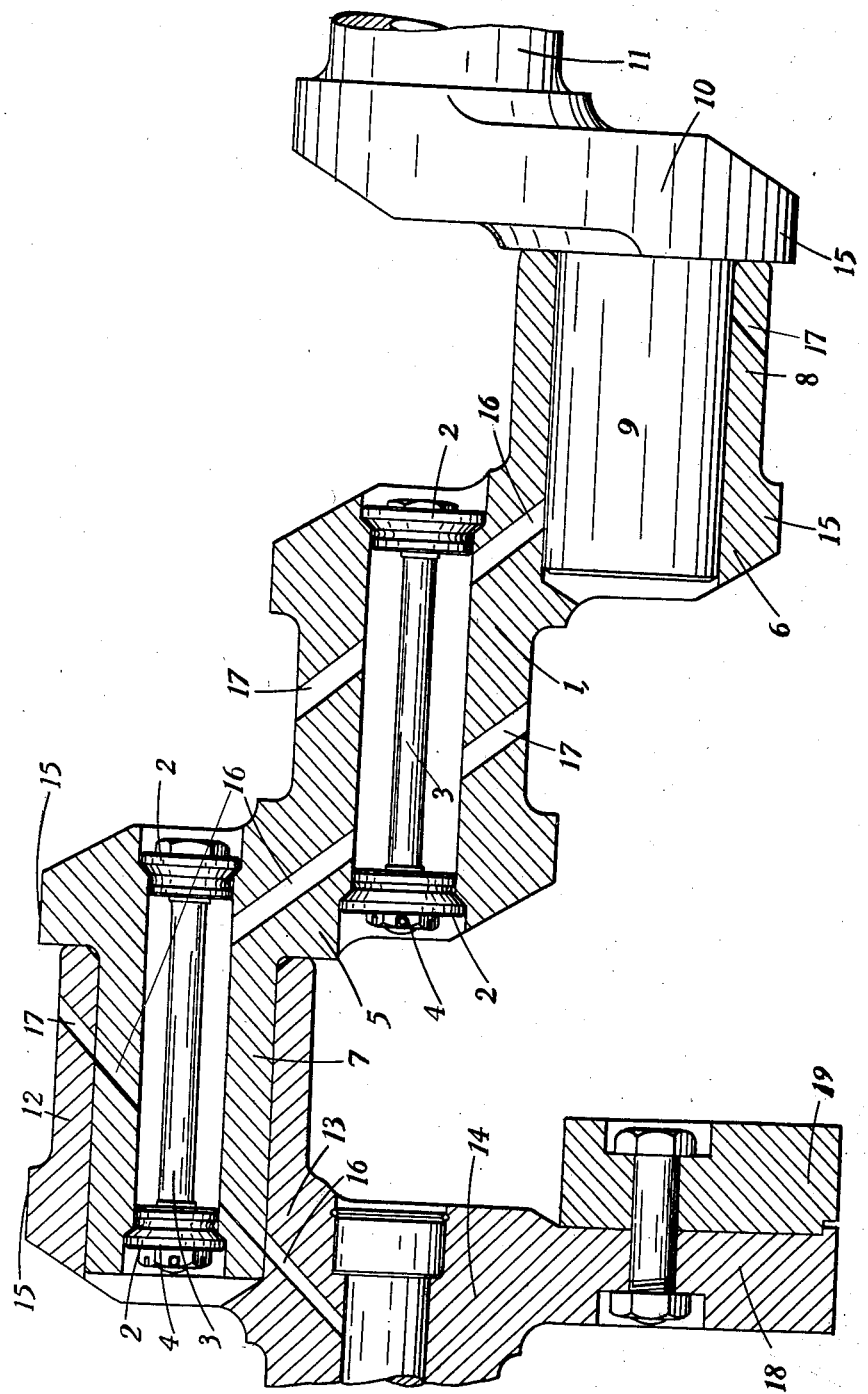
Inventor
Louis F. R. Fell
by Mawhinney & Mawhinney
Attorneys.

Patented Mar. 1, 1938

2,109,526

UNITED STATES PATENT OFFICE 2,109,526

BUILT-UP CRANKSHAFT

Louis Frederick Rudston Fell, Coventry, England, assignor to Armstrong Siddeley Motors Limited, Coventry, England Application February 15, 1937, Serial No. 125,911
In Great Britain February 4, 1936

1 Claim. (Cl. 74—597)

This invention relates to built-up crankshafts, particularly for internal-combustion engines. The main object is to provide an improved built-up crankshaft which can be easily assembled, and in particular one which will be capable of withstanding very high loads.

A built-up crankshaft, according to the main feature of the invention, includes a crank-arm terminating with a tubular part, and another crank-arm terminating with a pin part which extends into and fits the tubular part, preferably extending substantially throughout the length of the latter and almost to the far side of the crank-arm carrying the tubular part. The tubular part is bounded at its ends by shoulders formed on the two crank-arms and constitutes a crank-pin, i. e., it can receive the big end of the associated connecting-rod.

According to a further feature of the invention, a built-up crankshaft includes a portion adapted to be journalled and integral with crank-arms which terminate, respectively, with pin and tubular parts adapted to fit tubular and pin parts, respectively, of other crank-arms, the tubular parts being bounded at their ends by shoulders on the crank-arms and constituting crank-pins.

If desired keys or splines may be provided between a pin part and the associated tubular part into which it is to be fitted.

In the case of a four-cylinder engine there may be five bearings, or each of the two end throws may be arranged without an interposed bearing, or, of course, the crankshaft can be a two-bearing one.

Obviously the principles are applicable to crankshafts having two, three or more throws.

In accordance with common practice it is desirable that oiling passages should be drilled in the various crank-arms and pin and tubular parts for lubrication purposes.

The single figure of the accompanying drawing is a sectional elevation, taken along the crank throws, of a crankshaft according to the invention. It shows a portion 1 adapted to be journalled in a main bearing the portion being hollow and having the ends of its opening closed by caps 2, 2 held by a bolt 3 and nut 4. Integral with the bearing portion 1 are crank-arms 5, 6 of two crank throws. The arm 5 is formed integrally with a pin portion 7 which is hollow, its ends being closed by caps 2, 2 held by a bolt 3 and nut 4. The arm 6 is formed integrally with a tubular portion 8 the bore of which is of a size to receive a pin portion 9 fast on a crank-arm 10 of another bearing portion 11. In like manner, the pin portion 7 is a push fit in a tubular portion 12 of a crank-arm 13 fast with another bearing portion 14.

The surfaces of the tubular portions 8 and 12 form crank-pins bounded at their ends by shoulders 15, 15 on the respective crank-arms. Lubricant may be forced from one end of the crankshaft along the passages 16, 16 and to the various bearing surfaces by the passages 17, 17. 18 represents a crank-web with a balance weight 19 attached thereto.

What I claim as my invention and desire to secure by Letters Patent of the United States is:—

A built-up crankshaft including alined main shaft members, an arm integral with each member, a tubular offset part carried by each arm, a pair of outer tubular members and an intermediate tubular member disposed with their axes in parallelism and offset one from the other, the intermediate said tubular members alining axially with said main shaft members, an outer tubular member snugly fitting into a tubular offset part of one of said arms, a second outer tubular member snugly engaging about the tubular part of another of said arms, closure caps countersunk and snugly fitting into the opposite ends of at least one outer tubular member and said intermediate tubular member, the axes of the caps in said intermediate tubular member being coaxial with the axis of said main shaft members, and bolts removably holding said caps in position.

LOUIS F. R. FELL.